US006890224B2

(12) United States Patent
McCann

(10) Patent No.: US 6,890,224 B2
(45) Date of Patent: May 10, 2005

(54) ELECTRIC JET SKI

(76) Inventor: John McCann, 1123 Live Oak Cir., Knoxville, TN (US) 37932

(*) Notice: Subject to any disclaimer, the term of this patent is extended or adjusted under 35 U.S.C. 154(b) by 0 days.

(21) Appl. No.: 10/452,542

(22) Filed: Jun. 2, 2003

(65) Prior Publication Data
US 2004/0242088 A1 Dec. 2, 2004

(51) Int. Cl.$^7$ ............................................. B63H 21/17
(52) U.S. Cl. ...................... 440/6; 114/55.5; 114/55.57; 440/38
(58) Field of Search ................................ 440/6, 38, 40, 440/41, 42, 43; 114/55.5, 55.51, 55.56, 55.57, 355, 356, 357

(56) References Cited

U.S. PATENT DOCUMENTS

| | | | | |
|---|---|---|---|---|
| 385,180 | A | * | 6/1888 | Hunter .......................... 105/61 |
| 656,012 | A | * | 8/1900 | Chamberlain .................. 440/6 |
| 791,285 | A | * | 5/1905 | Page ............................. 440/6 |
| 1,832,808 | A | * | 11/1931 | Grier ............................. 440/6 |
| 3,387,582 | A | * | 6/1968 | Reeves .......................... 440/6 |
| 4,811,682 | A | * | 3/1989 | Hwang et al. ................ 114/345 |
| 5,376,027 | A | * | 12/1994 | Hergenrather ............... 440/38 |
| 5,405,276 | A | * | 4/1995 | Kato ............................. 440/38 |
| 5,490,768 | A | * | 2/1996 | Veronesi et al. ............ 417/356 |
| 5,685,254 | A | | 11/1997 | Jaques |
| 5,806,232 | A | | 9/1998 | James |
| 6,073,569 | A | | 6/2000 | Motsenbarker et al. |
| 6,273,015 | B1 | | 8/2001 | Motsenbarker et al. |
| 2001/0051474 | A1 | | 12/2001 | Matsuda et al. |
| 2002/0023579 | A1 | | 2/2002 | Profitt et al. |
| 2004/0166746 | A1 | * | 8/2004 | Krietzman ..................... 440/6 |

FOREIGN PATENT DOCUMENTS

| | | | |
|---|---|---|---|
| JP | 403248995 A | * | 11/1991 |
| JP | 405085471 A | * | 4/1993 |

* cited by examiner

Primary Examiner—Sherman Basinger
(74) Attorney, Agent, or Firm—Pitts & Brittian PC

(57) ABSTRACT

A jet-propulsion personal watercraft having improved features over conventional personal watercraft. The personal watercraft includes a hull including primarily an upper hull releasably secured to a lower hull. A gasket is disposed between the upper and lower hulls to seal the interior of the hull. A DC motor is powered by at least one battery and turns a water pump. The batteries are connected in series with a power controller. A gearing mechanism is provided for adjusting the rotational velocity of the motor to achieve the required rotational velocity of the pump. A forced air system is provided to force heat and battery acid fumes from within the hull when the motor is operating. A light circuit includes a switch, a front light and a rear light.

24 Claims, 4 Drawing Sheets

ELECTRIC JET SKI

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

The present invention pertains to the field of jet powered personal watercraft. More particularly, this invention is a battery powered electric jet ski having a separable hull for ease of maintenance.

2. Description of the Related Art

In the field of water sports, it is well know that personal watercraft otherwise referred to as Jet Skis are growing in popularity. In a conventional Jet Ski, a combustion engine is employed, using liquid fuel such as gasoline. For safety and convenience reasons, many Jet Ski users would rather not or cannot transport fuel to their docks or on their trailers for use in a conventional motorized Jet Ski. To this extent, gasoline can be messy and is dangerous if not used properly.

It is also well know that oil is required in combustion engines such as those used in conventional Jet Skis. Oil is used to lubricate the engine to keep it in proper working order. Like gasoline and any other petroleum product, oil is a hazardous material. Oil and gas both can be pollutants on the water in which the watercraft is operated. Petroleum products leaked into the water remain on the surface of the water in the vicinity of the watercraft. If the user or users of a Jet Ski were to fall off the watercraft or decide to swim, they will likely be in polluted water.

In view of the inconveniences and safety and environmental hazards associated with gas-powered personal watercraft, it is desirable to provide an electric personal watercraft. However, it is known that electric watercraft typically suffer from low power output and short duration of operation before power is drained.

Due to the environmental hazards associated with boats, and for various other reasons, many smaller lakes only allow electric powered boats. However, prior to the present invention, such has not been available in personal watercraft.

Conventional personal watercraft are constructed of a sealed hull typically provided with a relatively small access port for performing maintenance on the engine, pump, and other internal components. The hull is typically fabricated from upper and lower hull portions that are permanently glued and/or riveted together. The hulls of conventional personal watercraft are not intended to be separated.

A variety of personal watercraft and accessories therefor have been developed to overcome these and similar problems. Typical of the art are those devices disclosed in the following U.S. patents:

| U.S. Pat. No. | Inventor(s) | Issue Date |
| --- | --- | --- |
| 5,685,254 | G. Jaques | Nov. 11, 1997 |
| 5,806,232 | C. E. James | Sep. 15, 1998 |
| 6,073,569 | M. A. Motsenbarker et al. | Jun. 13, 2000 |
| 6,273,015 | M. A. Motsenbarker et al. | Aug. 14, 2001 | and the following U.S. patent applications:

| U.S. patent application Ser. No. | Inventor(s) | Publication Date |
| --- | --- | --- |
| 2001/00571474 | Y. Matsuda et al. | Dec. 13, 2001 |
| 2002/0023579 | J. A. Profitt et al. | Feb. 28, 2002 |

Of these patents and patent applications, the '254 device disclosed by Jacques is a hull adaptor for a personal watercraft. The hull adaptor is a second hull which is provided for the craft to be more buoyant and stable. As stated by Jacques, personal watercraft are typically configured to be powered by a small engine located toward the front of the watercraft hull. An intake channel is formed in the bottom of the hull somewhat after the engine. Jacques indicates that a major disadvantage especially for smaller watercraft is draft. Jacques continues that while the standard hull is reasonably functional for use by smaller riders, adult-sized individuals find that there is a loss of buoyancy, speed, stability and maneuverability when riding the craft. Accordingly, Jacques discloses his invention to attach to the bottom of a conventional watercraft to overcome its inherent deficiencies. Jacques does not teach a separable hull, nor an alternate means for powering a conventional personal watercraft.

The '232 device disclosed by James is a radio controlled fishing bait boat for delivering a baited fishing line to a remote location. Battery-powered electric motors for controlling a propeller and a rudder, batteries, and a controller are arranged within the interior of a hull. A pair of pivotable hatches are provided in the stern transom for access to bait storage compartments in the interior of the hull. Because of the low weight carried by the '232 device, the power plant is not of a capacity to power a human-ridden personal watercraft. Further, the small scale of the watercraft is not adaptable on a larger scale such as in a personal watercraft.

Matsuda et al., in their '474 patent application, disclose a personal watercraft of a jet-propulsive type that can maintain steering capability in a way adapted to forward movement and rearward movement of the watercraft even when throttle-close operation is performed and the amount of water ejected from a water jet pump is thereby reduced. The '474 application does not teach a means for electrically motivating a personal watercraft. Further, the '474 application does not teach a personal watercraft having a separable hull for ease of access to the internal components thereof.

The '569 and '015 patents issued to Motsenbocker et al., and the '579 application filed by Profitt et al. are each directed watercraft which take advantage of the weight of an electric motor and its component. Specifically, the '569 patent teaches "a low energy density power source that represents a large proportion (more than 10%, preferably more than 20%, more preferably greater than 30% and even more preferably greater than 50%) of the total watercraft weight . . . placed within at least one closed hull support member . . . , and a platform holding the occupants (or other cargo) are held above the support member(s) by struts." The high weight percentage consumed by the power source is described as an "essential feature of the invention" in that it minimizes contact of the surfaces of the watercraft with wave energy. As indicated in the '015 patent, instead of overcoming the weight disadvantage of the required batteries, the inventors disclose a means to "exploit the heavy battery problem in an electric boat design that simultaneously (i) allows use of massive battery power for a small watercraft, (ii) stabilizes the watercraft, partly by decreasing its center of gravity, (iii) decreases resistance to wave action and (iv) decreases friction to boat movement."

While the latter patent application and two issued patents discuss battery-powered watercraft, there in no teaching as to how such watercraft are operated. Further, they do not disclose a personal watercraft having a separable hull for easy access to the internal components thereof.

BRIEF SUMMARY OF THE INVENTION

The present invention is a personal watercraft having improved features over conventional personal watercraft. The personal watercraft includes a hull for housing the working components. The hull includes primarily an upper hull and a lower hull. The upper hull is releasably secured to the lower hull in order to access the internal components maintained therein. Each of the upper and lower hulls defines a collar about its perimeter. Each collar defines a plurality of openings for receipt of conventional fasteners. A gasket is disposed between the upper hull collar and the lower hull collar. The gasket defines a configuration substantially similar to that of each of the upper and lower hull collars. The gasket may be configured to also wrap around the outside edge of the upper and lower hull collars.

The watercraft is powered by a DC motor. At least one DC battery delivers power to the motor which turns a water pump. The water pump displaces water to the aft of the watercraft, thus creating a thrust to push the watercraft through the water. A plurality of batteries is electrically connected in series with a power controller. Connected in series between the power controller and a first battery is a contactor and a fuse. The contactor is used as an ON/OFF switch to selectively close and open the electrical circuit, thus to selectively provide electricity to the DC motor.

In an alternate embodiment of the electrical circuitry, a plurality of battery packs is provided for powering the motor. Each battery pack is electrically connected to a selector switch. The selector switch is used to switch from a battery pack whose charge has been drained to a fully charged battery pack. The selector switch is connected serially between the power controller and the fuse. In the preferred embodiment, the selector switch is accessible to the user without requiring access to the interior of the hull such that the user may switch between battery packs while riding the watercraft. Each battery pack has a sufficient charge to power the watercraft.

A throttle is provided for regulating the speed of the motor. Specifically, the throttle is provided for increasing and decreasing the rotational speed of the output shaft. Regulation of the motor output is accomplished via a throttle controller, which is electrically connected in parallel to the power controller. The throttle is electrically connected to the throttle controller and is accessible to the user in order to control the speed of the watercraft.

The rotational velocity of the output shaft is determined by the power input to the motor. A gearing mechanism is incorporated whereby the required pump velocity is accomplished when the motor output varies from the required pump velocity. Accordingly, the gearing mechanism is adapted to increase or decrease the effective rotational output from the motor to the pump.

The gearing mechanism includes a first pulley carried by the motor output shaft. Second and third pulleys are carried by a secondary shaft. A fourth pulley is carried by an input shaft incorporated in the pump. The first and second pulleys are disposed in a coplanar manner to receive a first belt. The third and fourth pulleys are disposed in a coplanar manner to receive a second belt. Thus, the first pulley is rotated as the motor output shaft is rotated. The first belt then translates the rotational movement of the first pulley to the second pulley, the secondary shaft, and the third pulley. The second belt then translates the rotational movement of the third pulley to the fourth pulley, and thus the pump input shaft. In one embodiment, each pulley defines a sprocket configuration and each belt defines a chain configured to cooperate with teeth defined by the sprockets.

In an alternate embodiment, the gearing mechanism is a gear box for converting the motor output rotational velocity to the required rotational velocity of the pump input.

A forced air system is provided to operate when the motor is powered. A fan is provided in electrical communication with the power controller in parallel with the motor whereby the fan operates when the motor is operating. The forced air system forces heat and battery acid fumes from within the hull in order to reduce the risk of failure of the electrical components housed within the hull.

A light circuit is electrically connected to the power controller. The light circuit includes a light switch, a front light and a rear light, each connected in series.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A personal watercraft having improved features over conventional personal watercraft is disclosed. The personal watercraft of the present invention is a jet propulsion watercraft commonly referred to as a Jet Ski and is illustrated at 10 in the figures. The personal watercraft, or watercraft 10, includes a separable hull 12 to enable one to more easily access the working components. The components of the watercraft 10 are electrically operated in order to reduce emissions, and to provide a safer and cleaner watercraft 10 as compared to prior devices. As a result of the improvements to the watercraft 10 of the present invention, the watercraft 10 is also easier and less expensive to manufacture and maintain.

Figure 1:
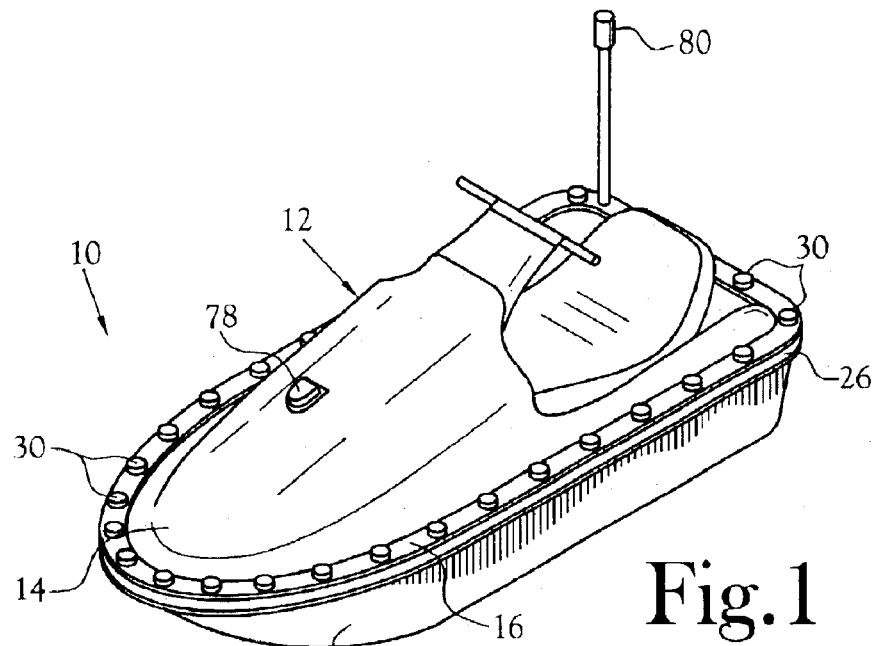
FIG. 1 is a perspective view of a personal watercraft constructed in accordance with various features of the present invention.
Figure 2:
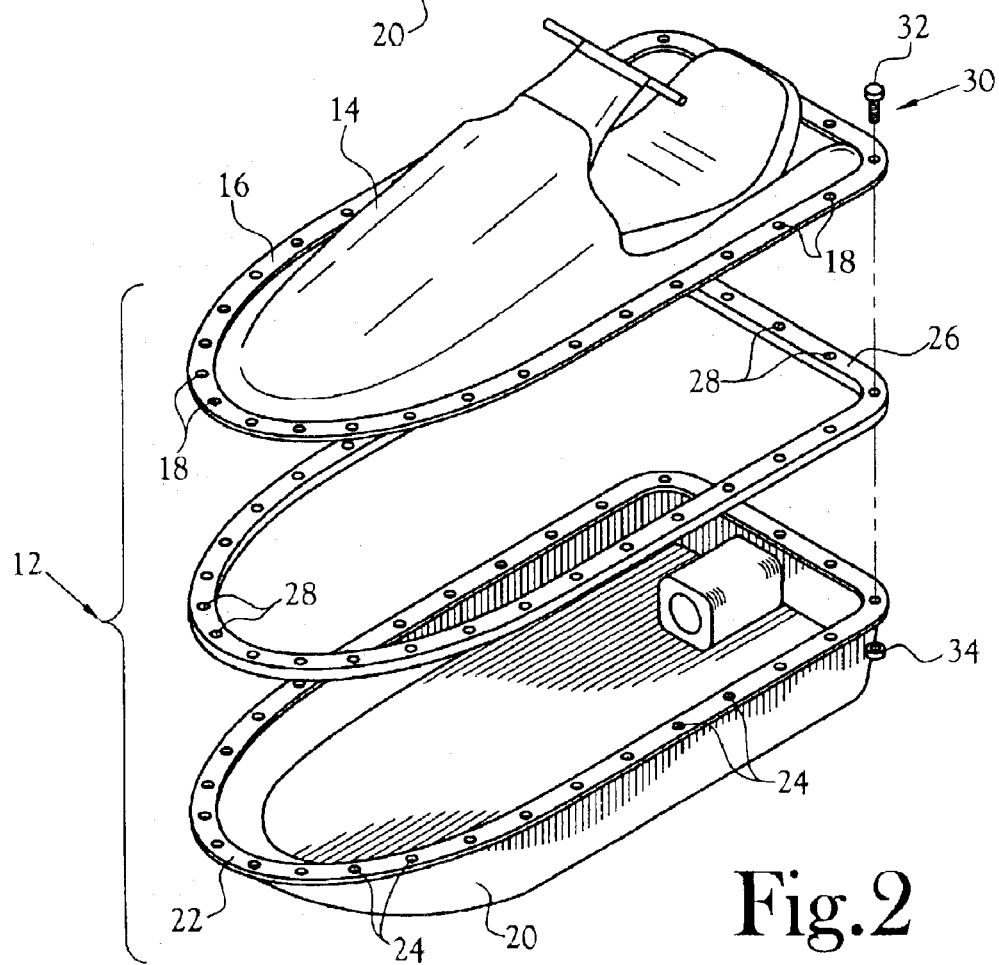
FIG. 2 is an exploded perspective view of the personal watercraft of FIG. 1 showing the separable hull.

As illustrated in FIGS. 1 and 2, the watercraft 10 includes a hull 12 for housing the working components. As best illustrated in FIG. 2, the hull 12 includes primarily an upper hull 14 and a lower hull 20. The upper hull 14 is releasably secured to the lower hull 20 in order to access the internal components maintained within the hull 12. In the illustrated embodiment, the upper hull 14 defines a collar 16 about its perimeter. The upper hull collar 16 defines a plurality of openings 18 for receipt of a conventional fastener 30. The lower hull 20 likewise defines a collar 22 about its perimeter to coincide with the upper hull collar 16. Further, a plurality of openings 24 is defined by the lower hull collar 22 to cooperate with the openings 18 defined by the upper hull collar 16 to receive the conventional fasteners 30. The upper and lower hulls 14,20 are manufactured in a conventional manner using conventional materials, such as with hand-laid fiberglass, resin-impregnated heat-pressed fiberglass, plastic, or other materials.

In order to seal the interior of the hull 12 when the upper and lower hulls 14,20 are fastened together, a gasket 26 is disposed between the upper hull collar 16 and the lower hull collar 22. The gasket 26 defines a configuration substantially similar to that of each of the upper and lower hull collars 16,22. To this extent, the gasket 26 defines a plurality of openings 28 to cooperate with the upper and lower hull collar openings 18,24 to receive the conventional fasteners 30. In the illustrated embodiment, each conventional fastener 30 includes a bolt 32 secured to the hull 12 using a cooperating nut 34.

While a particular fastening arrangement has been described, including the upper and lower hulls 14,20 being secured together using nuts 34 and bolts 32, it will be understood that other conventional non-destructive fastening arrangements are foreseeable. Specifically and although not shown, for streamlining and aesthetics, the gasket 26 may be configured to also wrap around the outside edge of the upper and lower hull collars 16,22. Further, and again not shown, the upper and lower hulls 14,20 may be secured together using conventional snap down buckles, wherein the configuration of the perimeters of each of the upper and lower hulls 14,20 are adapted to accommodate such fasteners 30.

Figure 3:
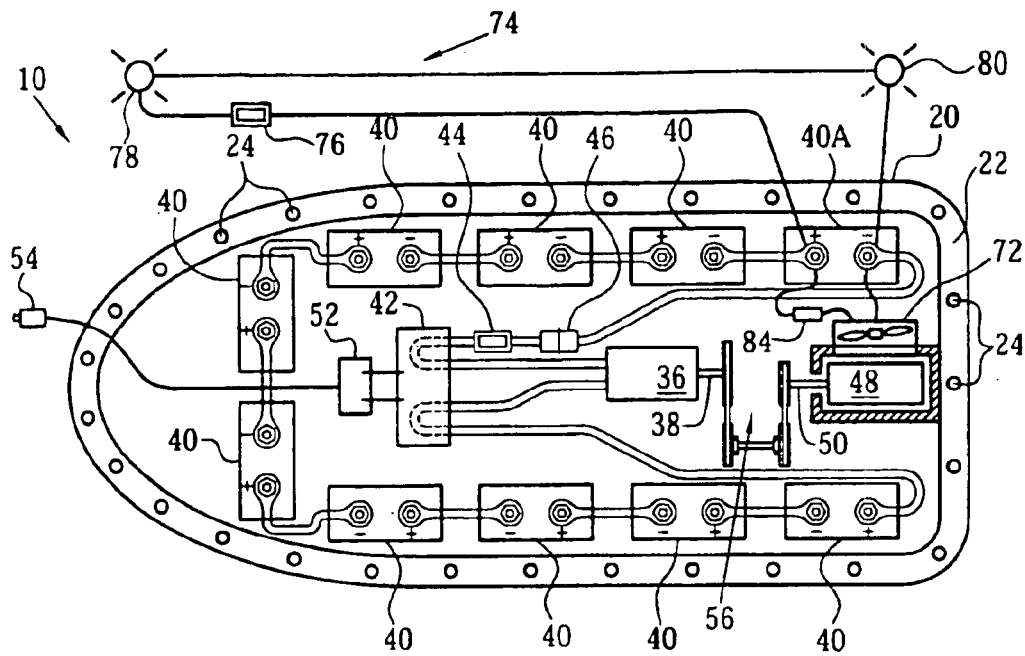
FIG. 3 is a schematic illustration of the lower hull and the electrical circuitry of the personal watercraft of FIG. 1.

As illustrated in FIG. 3, the watercraft 10 is powered by a DC motor 36. At least one DC battery 40 delivers power to the motor 36 which turns the input shaft 50 of a water pump 48. The water pump 48 displaces water to the aft of the watercraft 10, thus creating a thrust to push the watercraft 10 through the water. In the illustrated embodiment, a plurality of batteries 40 is electrically connected in series. Also connected in series with the batteries 40 is a power controller 42. Connected in series between the power controller 42 and a first battery 40A is a contactor 44 and a fuse 46. The contactor 44 is used as an ON/OFF switch to selectively close and open the electrical circuit, thus to selectively provide electricity to the DC motor 36. The fuse 46 is provided to fail in the event the circuit is shorted, becomes overloaded, or overheats.

Figure 4:
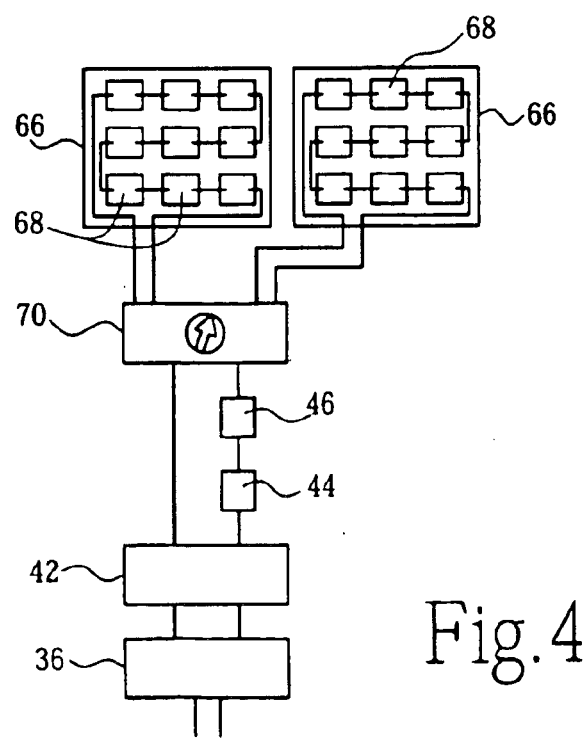
FIG. 4 is a schematic illustration of an alternate embodiment a portion of the electrical circuitry of the present invention.

Illustrated in FIG. 4 is an alternate embodiment of the electrical circuitry of the present invention. In this embodiment, a plurality of battery packs 66 is provided for powering the motor 36. Each battery pack 66 is electrically connected to a selector switch 70. The selector switch 70 is used to switch from a battery pack 66 whose charge has been drained to another, fully-charged battery pack 66. The selector switch 70 is connected serially between the power controller 42 and the fuse 46. In the preferred embodiment, the selector switch 70 is accessible to the user without requiring access to the interior of the hull 14 such that the user may switch between battery packs 66 while riding the watercraft 10.

Each battery pack 66 has a sufficient charge to power the watercraft 10 for a given period of time and includes one or more power cells 68. In the illustrated embodiment, each battery pack 66 includes a plurality of serially-connected power cells 68. It will be understood by those skilled in the art that other battery pack 66 configurations may be substituted with acceptable results.

Figure 4A:
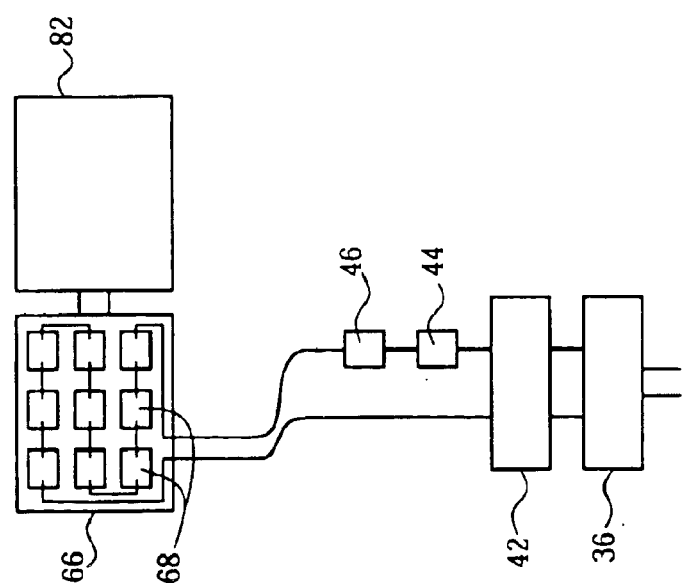
FIG. 4A is a schematic illustration of a further alternate embodiment a portion of the electrical circuitry of the present invention.

Illustrated in FIG. 4A is a further alternate embodiment of the electrical circuitry of the present invention. In this embodiment, a single battery pack 66 is provided for powering the motor 36. A fuel cell 82 is electrically connected to the battery pack 66 to continuously charge the battery pack 66 during operation of the watercraft 10. In so doing, the need for additional battery packs 66 or other power sources is eliminated. Further, by continuously charging the battery pack 66, longer run times are accomplished. The reduction of the number of required battery packs 66 reduces the overall weight of the watercraft 10, thereby increasing its performance and lowering its power requirements. While illustrated and described as being used in association with a battery pack 66, it will be understood that the fuel cell 82 may alternately be used in electrical communication with one or a series of batteries 40 described in the first-described embodiment of the present invention.

Referring again to FIG. 3, a throttle 54 is provided for regulating the speed of the motor 36. Specifically, the throttle 54 is provided for increasing and decreasing the rotational speed of an output shaft 38 associated with the motor 36. By actuating the throttle 54, the speed is increased, while releasing the throttle 54 likewise decreases the speed. Regulation of the motor 36 output is accomplished via a throttle controller 52. As illustrated in FIG. 3, the throttle controller 52 is electrically connected in parallel to the power controller 42. The throttle 54 is electrically connected to the throttle controller 52 and is accessible to the user in order to control the speed of the watercraft 10.

As mentioned, the motor 36 is in electrical communication with the power controller 42 and includes an output shaft 38. As in conventional motors, the rotational velocity of the output shaft 38 is determined by the power input to the motor 36. However, because the rotational velocity of the output shaft 38 of the motor 36 does not typically match the required rotational velocity of the pump 48, a gearing mechanism 56 is incorporated whereby the required pump 48 velocity is accomplished. In the illustrated embodiment, the motor 36 output is less than the required pump 48 velocity. Accordingly, the gearing mechanism 56 is adapted to increase the effective rotational output.

Figure 5:
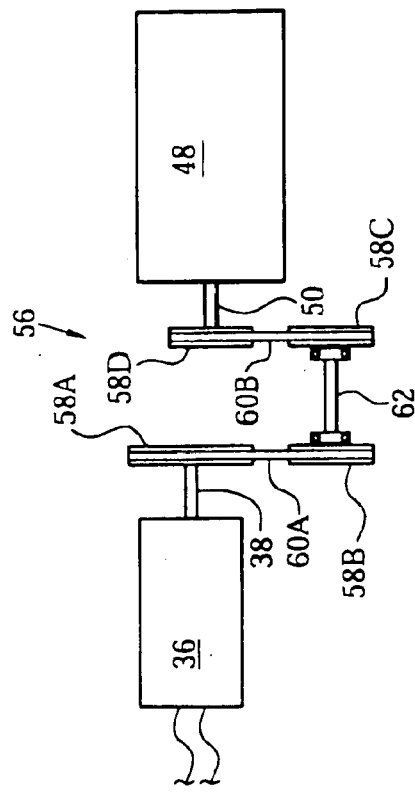
FIG. 5 is an enlarged schematic of the gearing mechanism incorporated in the personal watercraft illustrated in FIG. 3.

The gearing mechanism 56, as better illustrated in FIG. 5, includes a first pulley 58A carried by the motor output shaft 38. Second and third pulleys 58B,C are carried by a secondary shaft 62. A fourth pulley 58D is carried by an input shaft 50 incorporated in the pump 48. The first and second pulleys 58A,B are disposed in a coplanar manner to receive a first belt 60A. The third and fourth pulleys 58C,D are disposed in a coplanar manner to receive a second belt 60B. Thus, the first pulley 58A is rotated as the motor output shaft 38 is rotated. The first belt 60A then translates the rotational movement of the first pulley 58A to the second pulley 58B, the secondary shaft 62, and the third pulley 58C. The second belt 60B then translates the rotational movement of the third pulley 58C to the fourth pulley 58D, and thus the pump input shaft 50. In the illustrated embodiment, the first and fourth 58A,D pulleys are dimensioned to accomplish a ratio of 1:2. The second and third pulleys 58B,C each define substantially the same diameter.

Figure 6:
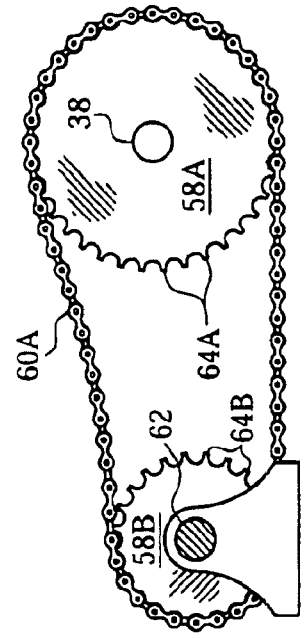
FIG. 6 is an elevation view of a chain and sprocket arrangement incorporated in one embodiment of the gearing mechanism of FIG. 5.

In the preferred embodiment, each of the pulleys 58 and belts 60 are provided with teeth 64 to prevent slipping. In the embodiment illustrated in FIG. 6, each pulley 58 defines a sprocket configuration and each belt 60 defines a chain configured to cooperate with teeth 64 defined by the sprockets. A sprocket 58 and chain 60 assembly has been found satisfactory to transfer rotation from the motor 36 to the pump 48 without slippage of the chains 60. With this configuration, the tolerance of the spacing of the sprockets 58 with respect to each other is greater in that the rotation of the pump 48 is generated as a result of engagement between the chains 60 and sprocket teeth 64 and does not rely on frictional contact between the belts 60 and pulleys 58. In the embodiment where rubber belts 60 are used, the belts 60 must be tensioned to prevent slipping with respect to the pulleys 58.

It will be understood that the diameters of the second and third pulleys 58B,C do not substantially affect the rotational velocity at the input shaft 50 of the pump 48. The ratio for determining the rotational velocity of the pump 48 relative to the rotational output of the motor 36 is determined by the ratio of between the diameters of the first and fourth pulleys 58A,D. In the embodiment where the pulleys 58 define radially-spaced teeth 64, the ratio is the number of teeth 64 in the first sprocket 58A relative to the number of teeth 64 in the fourth sprocket 58D. In the above example, the ratio is 1:2. Therefore, a motor 36 having an output of 4,000 rpm creates a rotational velocity of 8,000 rpm at the pump 48. Increasing or decreasing the diameter of the first pulley 58A increases or decreases, respectively, the rotational velocity at the pump 48. Conversely, increasing or decreasing the diameter of the fourth pulley 58D decreases or increases, respectively, the rotational velocity at the pump 48.

Referring once again to FIG. 3, a forced air system is provided to operate when the motor 36 is powered. Illustrated is a fan 72 in electrical communication with the first battery 40A. A switch 84 is provided in series with the fan 72 for controlling operation of the fan 72. This forced air system serves to force heat and battery acid fumes from within the hull 12. In so doing, the forced air system serves to reduce the risk of failure of the electrical components housed within the hull 12.

A light circuit 74 is electrically connected to the first battery 40A. The light circuit 74 includes a light switch 76, a front light 78, and a rear light 80, each connected in series. The lights 78,80 are provided for navigational purposes to meet boating regulations in most areas such that the watercraft 10 is operable after dusk. Prior jet propulsion personal watercraft do not incorporate lights 78,80 and are therefor not allowed to operate after dusk, primarily as a matter of safety.

Figure 7:
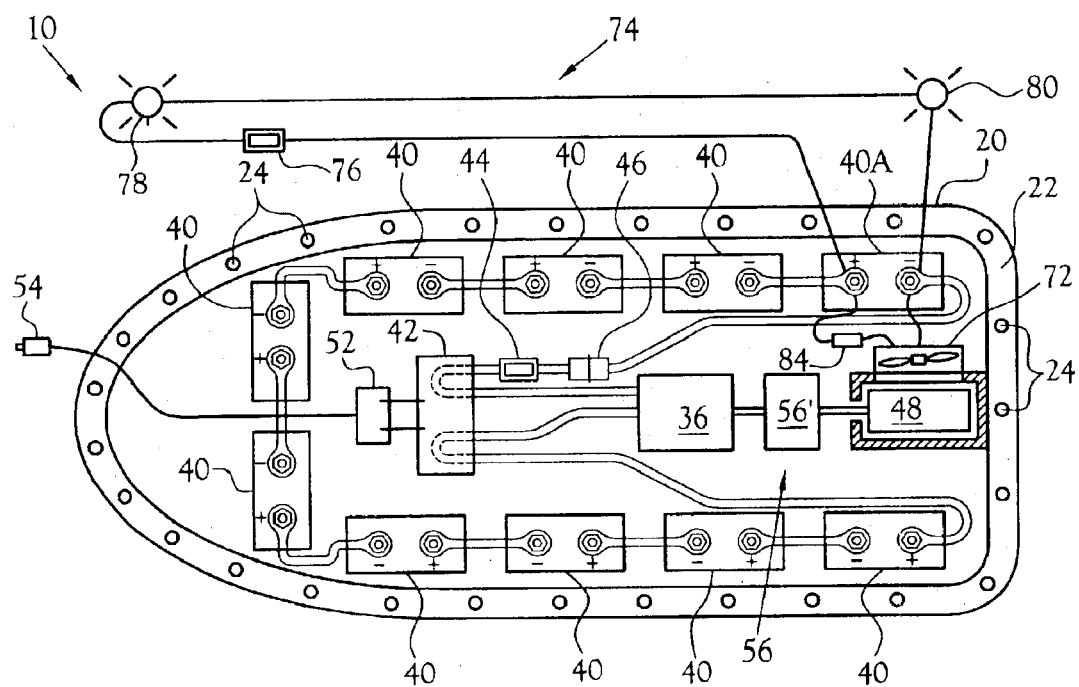
FIG. 7 is a schematic illustration of the lower hull and the electrical circuitry of an alternate embodiment of the personal watercraft of FIG. 1.

Illustrated in FIG. 7 is an alternate embodiment of the watercraft 10 of the present invention. In this embodiment, the gearing mechanism 56 is replaced with a gear box 56'. The gear box 56' is provided for converting the motor output rotational velocity to the required rotational velocity at the input shaft 50 of the pump 48.

From the foregoing description, it will be recognized by those skilled in the art that a personal watercraft having improved features over conventional personal watercraft has been provided. The personal watercraft of the present invention is a jet propulsion watercraft commonly referred to as a Jet Ski. The watercraft includes a separable housing to enable one to more easily access the working components. The watercraft is electrically powered in order to reduce emissions, and to provide a safer and cleaner watercraft as compared to prior devices. As a result of the improvements to the watercraft of the present invention, the watercraft is also easier and less expensive to manufacture and maintain.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, I claim:

1. A watercraft motivated using jet-propulsion, said watercraft comprising:
    a hull defining an upper hull and a lower hull releasably secured to said upper hull;
    at least one seal disposed between said upper hull and said lower hull to prevent fluid communication between said upper and lower hulls;
    at least one fastener to releasably secure said upper hull and said lower hull to each other;
    a motor carried within said hull, said motor being accessible by removal of said upper hull from said lower hull, said motor including an output shaft, said motor is a DC motor;
    an electrical circuit including:
        at least one battery in electrical connection with said DC motor;
        a power controller electrically connected in series with said at least one battery;
        a contactor electrically connected in series between said power controller and said at least one battery for selectively closing and opening said electrical circuit;
        a fuse electrically connected in series between said contactor and said at least one battery, said fuse being provided to fail if said electrical circuit fails;
        a throttle controller electrically connected in parallel to said power controller; and
        a throttle electrically connected to said throttle controller for regulating power delivered to said DC motor; and
    a pump carried by said hull and driven by said motor for displacing water in a selected direction and at a selected rate to motivate said watercraft across a body of water, said pump including an input shaft.

2. The watercraft of claim 1 wherein said upper hull defines a collar about an outer perimeter, said upper hull collar defining a plurality of openings, and wherein said lower hull defines a collar about an outer perimeter, said lower hull collar defining a plurality of openings, said plurality of upper hull collar openings and said plurality of lower hull collar openings cooperating to receive a plurality of said at least one fastener.

3. The watercraft of claim 2 wherein said at least one seal defines a plurality of openings configured to cooperate with said plurality of upper hull collar openings and said plurality of lower hull collar openings to receive said plurality of said at least one fastener.

4. The watercraft of claim 2 wherein said at least one seal is configured to overlap at least a portion of at least one of said upper hull collar and said lower hull collar.

5. The watercraft of claim 1 further comprising a gearing mechanism for converting a first rotational velocity of said motor output shaft to a second rotational velocity of said pump input shaft.

6. The watercraft of claim 1 further comprising a forced air system including a fan and a fan switch in serial electrical communication with said at least one battery, said forced air system forcing heat and battery acid fumes from within said hull.

7. The watercraft of claim 1 further comprising a light circuit electrically connected to said at least one battery, said light circuit including a light switch, a front light and a rear light electrically connected in series.

8. The watercraft of claim 1 wherein said electrical circuit further includes a fuel cell in electrical communication with said at least one battery for continuously recharging said at least one battery during operation of said watercraft.

9. A watercraft motivated using jet-propulsion, said watercraft comprising:
  a hull; and
  an electrical circuit including:
    a DC motor carried within said hull, said motor including an output shaft;
    at least one battery in electrical connection with said DC motor;
    a fuel cell in electrical communication with said at least one battery for continuously recharging said at least one battery during operation of said watercraft;
    a power controller electrically connected in series with said at least one battery;
    a contactor electrically connected in series between said power controller and said at least one battery for selectively closing and opening said electrical circuit;
    a fuse electrically connected in series between said contactor and said at least one battery, said fuse being provided to fail if said electrical circuit fails; and
    a pump carried by said hull and driven by said motor for displacing water in a selected direction and at a selected rate to motivate said watercraft across a body of water, said pump including an input shaft.

10. The watercraft of claim 9 wherein said at least one battery includes a plurality of battery packs electrically connected in parallel, said electrical circuit further including a selector switch for switching from one of said plurality of battery packs to another of said plurality of battery packs, a selected of said plurality of battery packs being used to power said DC motor.

11. The watercraft of claim 9 wherein said electrical circuit further includes:
  a throttle controller electrically connected in parallel to said power controller; and
  a throttle electrically connected to said throttle controller for regulating power delivered to said DC motor.

12. The watercraft of claim 9 further comprising a gearing mechanism for converting a first rotational velocity of said motor output shaft to a second rotational velocity of said pump input shaft.

13. The watercraft of claim 12 wherein said gearing mechanism includes:
  a first pulley carried by said motor output shaft;
  a secondary shaft rotatably mounted within said hull;
  a second pulley carried by said secondary shaft and disposed coplanar with said first pulley;
  a first belt disposed circuitous of said first pulley and said second pulley, whereby as said motor output shaft is rotated, said first pulley drives said first belt in a circuitous path, said first belt thereby rotating said second pulley and said secondary shaft;
  a third pulley carried by said secondary shaft whereby as said secondary shaft is rotated, said third pulley is rotated;
  a fourth pulley carried by said pump input shaft and disposed coplanar with said third pulley; and
  a second belt disposed circuitous of said third pulley and said fourth pulley, whereby as said third pulley is rotated, said second belt is driven in a circuitous path, said second belt thereby rotating said fourth pulley and said pump input shaft, said pump input shaft being rotated at a velocity equal to the product of a rotational velocity of said motor output shaft and a ratio of a diameter of said first pulley and a diameter of said fourth pulley.

14. The watercraft of claim 12 wherein said gearing mechanism is a gear box for converting said first rotational velocity of said motor output shaft to said second rotational velocity of said pump input shaft.

15. The watercraft of claim 9 further comprising a forced air system including a fan in electrical communication with said at least one battery, said forced air system forcing heat and battery acid fumes from within said hull.

16. The watercraft of claim 9 further comprising a light circuit electrically connected to said at least one battery, said light circuit including a light switch, a front light and a rear light electrically connected in series.

17. The watercraft of claim 9 wherein said hull includes:
  an upper hull;
  a lower hull releasably secured to said upper hull;
  at least one seal disposed between said upper hull and said lower hull to prevent fluid communication between said upper and lower hulls; and
  at least one fastener to releasably secure said upper hull and said lower hull to each other.

18. The watercraft of claim 17 wherein said upper hull defines a collar about an outer perimeter, said upper hull collar defining a plurality of openings, wherein said lower hull defines a collar about an outer perimeter, said lower hull collar defining a plurality of openings, and wherein said at least one seal defines a plurality of openings, said plurality of upper hull collar openings, said plurality of lower hull collar openings, and said plurality of seal openings cooperating to receive a plurality of said at least one fastener.

19. A watercraft motivated using jet-propulsion, said watercraft comprising:
  a hull; and
  an electrical circuit including:
    a DC motor carried within said hull, said motor including an output shaft;

at least one battery in electrical connection with said DC motor, said at least one battery including a plurality of battery packs electrically connected in parallel;

a selector switch for switching from one of said plurality of battery packs to another of said plurality of battery packs, a selected of said plurality of battery packs being used to power said DC motor;

a power controller electrically connected in series with said at least one battery;

a contactor electrically connected in series between said power controller and said at least one battery for selectively closing and opening said electrical circuit;

a fuse electrically connected in series between said contactor and said at least one battery, said fuse being provided to fail if said electrical circuit fails; and a pump carried by said hull and driven by said motor for displacing water in a selected direction and at a selected rate to motivate said watercraft across a body of water, said pump including an input shaft.

20. A watercraft motivated using jet-propulsion, said watercraft comprising:

a hull; and an electrical circuit including:
a DC motor carried within said hull, said motor including an output shaft;
at least one battery in electrical connection with said DC motor;
a power controller electrically connected in series with said at least one battery;
a throttle controller electrically connected in parallel to said power controller;
a throttle electrically connected to said throttle controller for regulating power delivered to said DC motor;
a contactor electrically connected in series between said power controller and said at least one battery for selectively closing and opening said electrical circuit;
a fuse electrically connected in series between said contactor and said at least one battery, said fuse being provided to fail if said electrical circuit fails; and
a pump carried by said hull and driven by said motor for displacing water in a selected direction and at a selected rate to motivate said watercraft across a body of water, said pump including an input shaft.

21. A watercraft motivated using jet-propulsion, said watercraft comprising:

a hull; and an electrical circuit including:
a DC motor carried within said hull, said motor including an output shaft;
at least one battery in electrical connection with said DC motor;
a power controller electrically connected in series with said at least one battery;
a contactor electrically connected in series between said power controller and said at least one battery for selectively closing and opening said electrical circuit;
a fuse electrically connected in series between said contactor and said at least one battery, said fuse being provided to fail if said electrical circuit fails;
a pump carried by said hull and driven by said motor for displacing water in a selected direction and at a selected rate to motivate said watercraft across a body of water, said pump including an input shaft; and
a gearing mechanism for converting a first rotational velocity of said motor output shaft to a second rotational velocity of said pump input shaft.

22. The watercraft of claim 21 wherein said gearing mechanism includes:

a first pulley carried by said motor output shaft;

a secondary shaft rotatably mounted within said hull;

a second pulley carried by said secondary shaft and disposed coplanar with said first pulley;

a first belt disposed circuitous of said first pulley and said second pulley, whereby as said motor output shaft is rotated, said first pulley drives said first belt in a circuitous path, said first belt thereby rotating said second pulley and said secondary shaft;

a third pulley carried by said secondary shaft whereby as said secondary shaft is rotated, said third pulley is rotated;

a fourth pulley carried by said pump input shaft and disposed coplanar with said third pulley; and a second belt disposed circuitous of said third pulley and said fourth pulley, whereby as said third pulley is rotated, said second belt is driven in a circuitous path, said second belt thereby rotating said fourth pulley and said pump input shaft, said pump input shaft being rotated at a velocity equal to the product of a rotational velocity of said motor output shaft and a ratio of a diameter of said first pulley and a diameter of said fourth pulley.

23. The watercraft of claim 21 wherein said gearing mechanism is a gear box for converting said first rotational velocity of said motor output shaft to said second rotational velocity of said pump input shaft.

24. A watercraft motivated using jet-propulsion, said watercraft comprising:

a hull; and an electrical circuit including:
a DC motor carried within said hull, said motor including an output shaft;
at least one battery in electrical connection with said DC motor;
a power controller electrically connected in series with said at least one battery;
a contactor electrically connected in series between said power controller and said at least one battery for selectively closing and opening said electrical circuit;
a fuse electrically connected in series between said contactor and said at least one battery, said fuse being provided to fail if said electrical circuit fails;
a pump carried by said hull and driven by said motor for displacing water in a selected direction and at a selected rate to motivate said watercraft across a body of water, said pump including an input shaft; and
a light circuit electrically connected to said at least one battery, said light circuit including a light switch, a front light and a rear light electrically connected in series.

* * * * *